US012560252B2

(12) United States Patent
　　Mccarra

(10) Patent No.:　US 12,560,252 B2
(45) Date of Patent:　　Feb. 24, 2026

(54) SYSTEMS AND METHODS FOR PISTON CHECK VALVES

(71) Applicant: SCV Valve, LLC, Santa Fe, TX (US)

(72) Inventor: Sidney Mccarra, League City, TX (US)

(73) Assignee: SCV Valve, LLC, Santa Fe, TX (US)

( * ) Notice: Subject to any disclaimer, the term of this patent is extended or adjusted under 35 U.S.C. 154(b) by 79 days.

(21) Appl. No.: 18/513,992

(22) Filed: Nov. 20, 2023

(65) Prior Publication Data

US 2024/0084905 A1　　Mar. 14, 2024

Related U.S. Application Data

(63) Continuation of application No. 17/664,378, filed on May 20, 2022, now Pat. No. 11,859,722, which is a continuation of application No. 17/077,549, filed on Oct. 22, 2020, now Pat. No. 11,365,820.

(60) Provisional application No. 62/925,654, filed on Oct. 24, 2019.

(51) Int. Cl.
　　*F16K 15/06*　　(2006.01)
　　*F16K 15/18*　　(2006.01)
　　*F16K 27/02*　　(2006.01)
(52) U.S. Cl.
　　CPC ............ *F16K 15/063* (2013.01); *F16K 15/18* (2013.01); *F16K 27/0209* (2013.01); *Y10T 137/7925* (2015.04); *Y10T 137/7929* (2015.04); *Y10T 137/7937* (2015.04)
(58) Field of Classification Search
　　CPC ......... Y10T 137/7929; Y10T 137/7925; Y10T 137/7937; Y10T 137/86791; F16K 15/063; F16K 15/026
　　See application file for complete search history.

(56) References Cited

U.S. PATENT DOCUMENTS

| | | | |
|---|---|---|---|
| 1,029,464 A | 6/1912 | Ruwell | |
| 1,322,938 A | 11/1919 | Parker | |
| 1,519,856 A | 12/1924 | Lorraine | |
| 1,691,449 A | 11/1928 | Sharp | |
| 1,841,337 A | 1/1932 | Roessler | |
| 1,944,518 A | 1/1934 | Lovekin et al. | |
| 2,143,399 A | 1/1939 | Abercrombie | |
| 2,192,425 A | 3/1940 | Herbert et al. | |
| 2,306,903 A | 12/1942 | Ray | |
| 2,781,775 A | 2/1957 | Merrill | |
| 3,092,133 A | 6/1963 | Clark | |
| 3,648,718 A * | 3/1972 | Curran ................... | F16K 47/02 251/210 |
| 4,039,003 A | 8/1977 | Cheek | |

(Continued)

OTHER PUBLICATIONS

Hagan, Steve. "Control valve technology", Dec. 18, 2003.

*Primary Examiner* — Robert K Arundale

(74) *Attorney, Agent, or Firm* — Bookoff McAndrews, PLLC

(57) ABSTRACT

A piston check valve system includes a body including an upstream end and a downstream end, a bonnet secured to a proximal opening of the body, and a piston secured within the body, the piston being moveable between a closed position in which the piston rests upon a valve seat and an open position in which the piston is spaced away from the valve seat. The piston check valve system also includes a retainer configured to guide and retain the piston and to secure the valve seat within the body.

18 Claims, 2 Drawing Sheets

(56)        References Cited

U.S. PATENT DOCUMENTS

| 4,362,185 | A | | 12/1982 | Kadner | |
|---|---|---|---|---|---|
| 4,679,584 | A | | 7/1987 | Wolff | |
| 4,718,450 | A | | 1/1988 | Ezekoye | |
| 4,936,339 | A | | 6/1990 | Bennett | |
| 6,019,125 | A | | 2/2000 | Reverberi | |
| 6,047,734 | A | * | 4/2000 | Robinson | F16K 3/246 |
| | | | | | 137/625.37 |
| 6,089,262 | A | | 7/2000 | Hart | |
| 9,279,508 | B1 | * | 3/2016 | Sankaye | F16K 17/082 |
| 2005/0016597 | A1 | * | 1/2005 | Hope | F16K 17/0466 |
| | | | | | 137/516.27 |
| 2008/0078460 | A1 | | 4/2008 | Roper et al. | |

* cited by examiner

SYSTEMS AND METHODS FOR PISTON CHECK VALVES

CROSS-REFERENCE TO RELATED APPLICATION(S)

This application claims the benefit of priority to U.S. application Ser. No. 17/664,378, filed on May 20, 2022, which claims the benefit of priority to U.S. application Ser. No. 17/077,549, filed on Oct. 22, 2020, now U.S. Pat. No. 11,365,820, issued on Jun. 21, 2022, which claims the benefits of priority to U.S. Provisional Application No. 62/925,654, filed on Oct. 24, 2019, the entireties of which are herein incorporated by reference.

TECHNICAL FIELD

Aspects of the present disclosure relate generally to valves and valve systems useful, for example, for fluid handling. In particular, aspects of the present disclosure relate to methods and systems for piston check valves.

BACKGROUND

Valve devices, such as piston check valve assemblies, are useful for fluid handling in, for example, the oil and gas, power, chemical, water works, waste water, and manufacturing industries. Piston check valves are robust systems that are operable to prevent backflow in fluid handling systems located under harsh environments and operable under severe conditions. In order to perform in these environments, valve systems include components that are resistant to debris, corrosion, and wear. While the valve is in service, components of the valve assembly require regular inspections and maintenance. Even when inspections and maintenance are performed regularly, wear accumulates due to the operation of moving parts of the valve, affecting locations that cannot be accessed without disconnecting the valve device from adjacent fluid handling components. In order to service or replace these components, it can be necessary to disconnect the valve from upstream and downstream components. However, removing the valve from a line is a time consuming process that introduces significant expense.

SUMMARY

According to certain embodiments, systems and methods are disclosed for a piston check valve for fluid handling.

In one aspect, a piston check valve system may include a body including an upstream end and a downstream end, a bonnet secured to a proximal opening of the body, and a piston secured within the body, the piston being moveable between a closed position in which the piston rests upon a valve seat and an open position in which the piston is spaced away from the valve seat. The piston check valve system may also include a retainer configured to guide and retain the piston and to secure the valve seat within the body.

In another aspect, a piston check valve system may include a body including an upstream opening and a downstream opening, and a piston secured within the body between the upstream opening and downstream opening, the piston being moveable between a closed position in which an end face blocks a flow of fluid and an open position. The piston check valve system may also include a resilient member biasing the piston towards the closed position and a cage surrounding a proximal end of the piston, the cage including a distal bridge configured to contact an outer periphery of the end face of the piston.

In yet another aspect, a method of assembling a piston check valve system including a removable valve seat may include securing the removable valve seat in a body of the piston check valve assembly and retaining the removable valve seat with a retainer that presses upon a surface of the removable valve seat. The method may also include positioning a piston within the retainer such that the piston is configured to slide with respect to the retainer and securing the retainer with a bonnet.

In another aspect, a piston check valve assembly may include a body, a bonnet secured to the body, a piston provided between the body and the bonnet, a retainer configured to guide and retain the piston, and a removable valve seat.

In another aspect, a method of removing a valve seat from a piston check valve assembly may include separating a bonnet from a body of the piston check valve assembly, removing a resilient member and a piston through an opening in the body, separating a valve seat from the body, and removing the valve seat through the opening.

In another aspect, a piston check valve assembly may include a body, a bonnet secured to the body, a piston provided between the body and the bonnet, a retainer configured to guide and retain the piston, and a valve seat configured to form a seal with the piston, wherein the piston is configured to travel to an upper end of the retainer when the piston check valve assembly is open.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figures 1, 2:
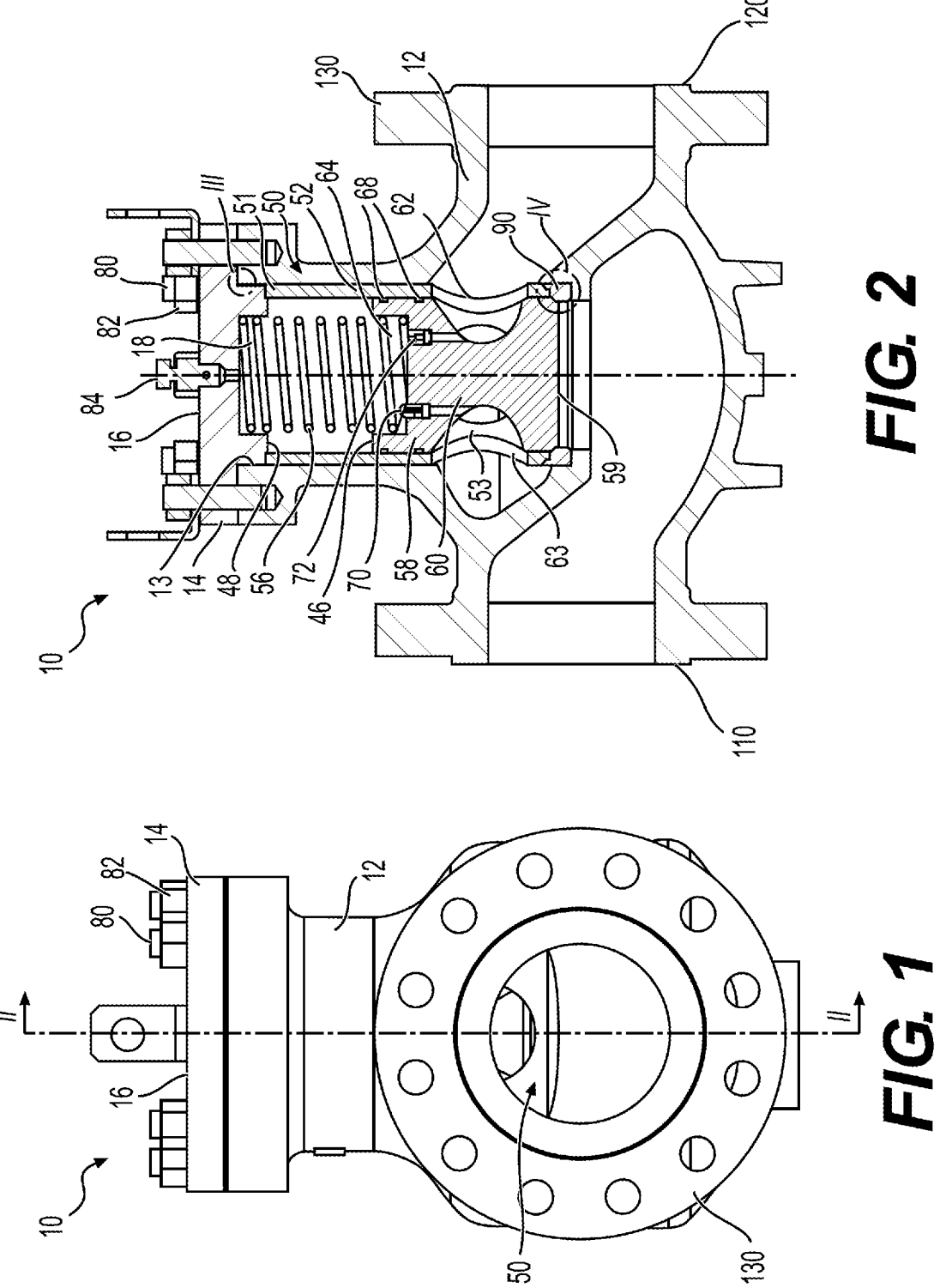
FIG. 1 is a downstream end view of a piston check valve system, according aspects of the present disclosure.
FIG. 2 is a cross-sectional view of the piston check valve system along line II-II of FIG. 1.

FIG. 1 is a view of a piston check valve assembly 10 (e.g., showing a downstream end) according to aspects of the present disclosure. Piston check valve assembly or piston check valve system 10 may include a body 12, a bonnet 14, and a valve assembly or piston assembly 50. Body 12 may include a pair of opposed ends formed by annular flanges or ports 130. A hollow interior of body 12 may house piston assembly 50. Bonnet 14 may be secured to an upper opening of body 12 to secure piston assembly 50.

Body 12 may define an upstream end 110 and a downstream end 120 (FIG. 2). Annular flanges or ports 130, formed at upstream and downstream ends 110 and 120, respectively, may be sized and shaped for connection to upstream and downstream components, and may include a series of bolt holes to allow ports 130 to facilitate leak-free connections to these components.

Bonnet 14 may be secured to a top surface of body 12 by a plurality of fasteners 80 and fixing members 82. In the exemplary configuration shown in FIG. 1, each fastener 80 may include a threaded bolt or stud having an end embedded within body 12, while fixing members 82 may include respective nuts or other suitable tightening mechanism connected to the threading of the fasteners 80. Bonnet 14 may have an annular shape, including a proximal face 16 formed with a series of holes through which fasteners 80 extend. Bonnet 14 may also include a bottom end or bottom face 48, and a central recess 18 (FIG. 2).

Body 12 may be formed of a corrosion-resistant material, such as a metal material. Body 12 may be formed by carbon steel, for example. Bonnet 14 may be formed of a similar material as body 12 (e.g., a metal material such as carbon steel).

With reference to FIG. 2, which is a cross-sectional view of check valve system 10 along line II-II of FIG. 1, piston assembly 50 may form a one-way valve that permits flow of fluid in a flow direction from upstream end 110 toward downstream end 120, and prohibits flow of fluid in a direction from downstream end 120 toward upstream end 110. Piston assembly 50 may include a cage or retainer 52, a removable valve seat 90, a resilient member 56, and a piston 58.

Retainer 52 of piston assembly 50 may have a substantially cylindrical body portion, such as a proximal portion 51. A distal portion 53 extending from proximal portion 51 may form a cage that includes openings 62 separated by a series of bridges 63, such that each bridge 63 is surrounded by a pair of openings. Proximal portion 51 may include a top surface that contacts bottom face 48 of bonnet 14, either directly or via a gasket. A distal end of retainer 52, formed at the bottom of distal portion 53, may face valve seat 90 via a mechanism described below. An interior of retainer 52 may define an axially-extending opening within which piston 58 is moveably secured.

Piston 58 may be positioned within the opening of retainer 52 so as to be moveable between a closed position in which piston 58 rests on valve seat 90, as shown in FIG. 2, and an open position in which piston 58 is spaced away from and does not contact valve seat 90. A central pillar 60 of piston 58 may, when piston 58 is in a closed position illustrated in FIG. 2, be surrounded by these openings 62 and bridges 63 of retainer 52. A distal end face 59, extending below central pillar 60, may block an opening in body 12 when piston 58 rests on valve seat 90. Piston 58 may be biased towards this closed position by resilient member 56.

A recess 64, formed in a proximal end of piston 58, may receive and secure a distal end of resilient member 56, such as a spring. Recess 64 may be surrounded by a rim 46 defined by piston 58. Rim 46 may define a circular surface (when viewed from above) that opposes the face 48 of bonnet 14. A proximal end of resilient member 56 opposite rim 46 may be fixed to bonnet 14 and may extend within a central recess 18 defined by bonnet 14. When bonnet 14 is secured to body 12, recess 18 may face the interior of body 12 and piston 58.

Below resilient member 56, a body of piston 58 itself may further include one or more ball check valves 70 (e.g., configured to relieve excess pressure), and an orifice fitting 72, which may each be accessible via recess 64. One or more piston rings 68 may be provided in an outer circumference of a proximal portion of piston 58 to facilitate sliding motion of piston 58 within retainer 52. A distal end face 59 of piston 58 may include an outer circumference configured to sealingly contact seat 90 at a peripheral surface of end face 59, while a central portion of face 59 faces downward toward a bottom of body 12. The outer periphery of end face 59 may include a tapered surface or chamfer for contacting seat 90, as described below.

A vent fitting 84 may be secured so as to extend through a center of proximal face 16 of bonnet 14. Vent fitting 84 may be configured to relieve excess pressure within retainer 52. For example, vent fitting 84 may be in communication with the interior of retainer 52 and may relieve pressure within retainer 52 when piston 58 moves proximally and reduces the size of a chamber between piston 58 and bottom face 48 of bonnet 14.

A force of resilient member 56, such as a spring force, may be sufficient to close piston assembly 50 and block reverse or upstream flow of fluid in a direction from downstream end 120 toward upstream end 110. A sufficient flow in an opposite direction may be permitted. For example, when fluid (e.g., oil, other petroleum products, water, etc.) introduced from upstream end 110 applies sufficient force on end face 59, piston 58 may move proximally (upwards in FIG. 2) so as to allow fluid communication in a direction from upstream end 110 toward downstream end 120.

Resilient member 56 may have a resistive force (e.g., spring force) selected to allow piston 58 to move proximally such that rim 46 is brought into contact with face 48 of bonnet 14. Piston assembly 50 may be configured to allow piston 58 to travel an entire length of piston assembly 50 that is defined by retainer 52. For example, resilient member 56 may be configured to permit piston 58 to travel to a fully open position in which end face 59 contacts bottom face 48 of bonnet 14, as described below.

At each position of piston 58, including a fully-open position where rim 46 contacts face 48, piston 58 may be aligned within retainer 52. In particular, when piston 58 abuts bonnet 14, piston 58 may have no angular tilt or substantially no angular tilt with respect to an axial direction defined by retainer 52 (e.g., a proximal to distal direction corresponding to the vertical axis in FIG. 2). When piston 58 abuts seat 90, piston 58 may also have no angular tilt or substantially no angular tilt with respect to this axial direction.

During movement of piston 58, bridges 63 may guide an outer circumference of the distal end portion of piston 58 while cylindrical proximal portion 51 of retainer 52 guides the outer circumference of the proximal end portion of piston 58. This may prevent vibration and chatter of piston 58 within retainer 52. Thus, the proximal and distal portions of piston 58 may remain aligned and prevented from tilting when in the closed position, the fully-open position, and in each intermediate position therebetween. In at least some configurations, this alignment may tightly secure piston 58 within retainer 52. Additionally, piston rings 68 may be formed of a low-friction material configured to slide along an inner peripheral surface of retainer 52, so as to reduce friction and wear.

Valve seat 90 may be a ring-shaped member inserted within a recess of body 12. Valve seat 90 may be formed of a suitable corrosion and wear-resistant material that is suitable for repeated contact with the angled or chamfered surface of face 59 of piston 58. Valve seat 90 may be formed of a suitable metal material, such as a material including carbon steel. In some aspects, valve seat 90 may include a polymeric material, such as polytetrafluoroethylene (PTFE), polyether ether ketone (PEEK), other polymers, and composites thereof. Valve seat 90 may be coaxially disposed with respect to retainer 52 and opening 13.

Figure 4:
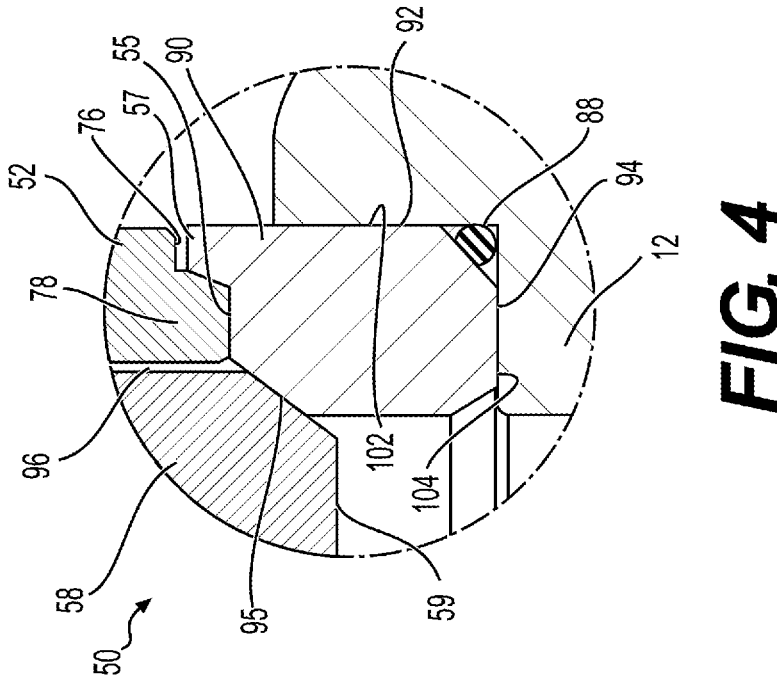
FIG. 4 is an enlarged view of section IV of FIG. 2.

Retainer 52 may be configured to press upon and secure seat 90 within body 12 while remaining stationary during operation of piston assembly 50. Retainer 52 may be secured by bottom face 48 of bonnet 14, which presses upon retainer 52 and urges retainer 52 in a distal direction (e.g., by applying a pre-determined torque to fixing members 82). Due to the force applied to the end of proximal portion 51 of retainer 52, as best shown in FIG. 4, an end of distal portion 53 may press upon a proximal-facing surface of seat 90, securing seat 90 within a recess of body 12. Thus, retainer 52 may form a containment device that secures seat 90.

The assembly of retainer 52 and seat 90 may further facilitate reduction in chatter and vibration, even when valve system 10 is in a partially or fully open state, and during transitions between closed and open states. In some aspects, by applying a pressing force to seat 90, seat 90 may be firmly secured to body 12, without the need to be permanently attached to body 12 (e.g., by welding). This may facilitate removal of seat 90 when necessary, as described below. Additionally, reducing or eliminating vibration in this manner may reduce noise and extend the life of piston assembly 50 by reducing wear on piston 58, retainer 52, and valve seat 90.

Figure 3:
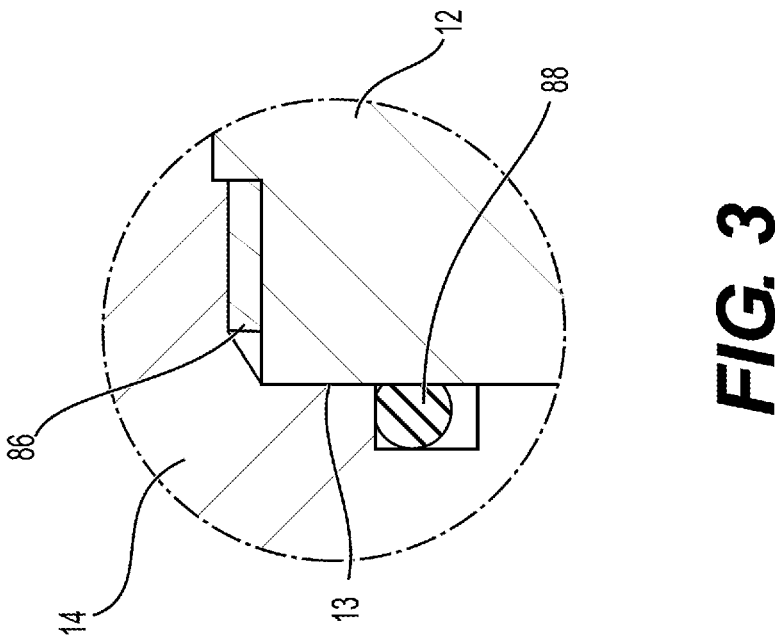
FIG. 3 is an enlarged view of section III of FIG. 2.

As shown in FIGS. 2 and 3, bonnet 14 may be fixed to an upper surface of body 12 so as to protrude within opening 13 of body 12. With reference to FIG. 3, a gasket 86 and an O-ring 88 may be provided to seal the interface between body 12 and bonnet 14. Gasket 86 may extend circumferentially along an interface between bonnet 14 and body 12. Gasket 86 may form a seal between a distally-facing surface of bonnet 14 and a proximally-facing surface of body 12. One or more additional sealing members, such as O-rings 88, may be placed within respective recesses of bonnet 14. Additionally or alternatively, one or more O-rings 88 may be placed within one or more recesses of body 12. Resilient sealing members, such as O-rings 88, may form a seal between a radially-inwardly facing surface of body 12 and a corresponding surface of bonnet 14.

FIG. 4 is a cross-sectional view of piston assembly 50 when in the closed position, showing exemplary positions of piston 58, retainer 52, and seat 90. When piston assembly 50 is closed, retainer 52 and seat 90 may each surround part of the distal end portion of piston 58. In particular, seat 90 may extend distally of retainer 52 so as to surround the distal end of piston 58, including end face 59. A sealing surface 95 of valve seat 90 may be shaped to receive a mating surface of piston 58. Sealing surface 95 may include a surface having a substantially circular shape when viewed from above. Sealing surface 95 may be an inclined or chamfered surface formed at an inner periphery of seat 90. Piston 58 may be brought into contact with sealing surface 95 of valve seat 90 when piston 58 blocks the flow of fluid in an upstream direction. Thus, each time piston assembly 50 transitions from an open position to a closed position, piston 58 may impact sealing surface 95.

A clearance or gap 96 may be present at one or more locations between piston 58 and retainer 52. Gap 96 may be formed between one or more areas where piston 58 is out of contact, or in discontinuous contact, with retainer 52. While not shown in FIG. 4, piston 58 may also contact retainer 52 at one or more locations of distal portion 53, such as bridges 63. Distal portion 53 of retainer 52 may be sized so as to prevent significant inclination of piston 58 with respect to a vertical direction (as represented by the vertical axis extending through piston 58 FIG. 2).

As discussed above, bonnet 14 may apply a force to retainer 52 that presses retainer 52 against valve seat 90. This force may be transferred from retainer 52 to seat 90 at an interface between these two components, as shown in FIG. 4. For example, retainer 52 may include an outer retainer recess 76 and an inner retainer protrusion 78 at the interface between retainer 52 and seat 90. Seat 90 may include an inner seat recess 55 and an outer seat protrusion 57, such that seat recess 55 faces and receives retainer protrusion 78, while seat protrusion 57 faces and is received by retainer recess 76. Seat protrusion 57 may be formed by a lip or ridge on a radially peripheral portion of seat 90. Retainer protrusion 78 may press upon the surface of recess 55. While a gap may be present between recess 76 and protrusion 57 as shown in FIG. 4, protrusion 57 and recess 76 may be sized so as to contact each other. Additionally or alternatively, the locations of protrusions 57 and 78 (and recesses 55 and 76) may be reversed, such that retainer 52 includes a protrusion at the radially-outer portion thereof and seat 90 includes a recess at a corresponding outer portion.

Valve seat 90 may include an outer circumferential surface 102 that extends about an outer periphery of the ring-shaped seat 90. Circumferential surface 102 may face body 12 so as to form an interface 92, as shown in FIG. 4. Interface 92 between seat 90 and body 12 may be free of welding, or other mechanisms for permanently fixing seat 90 to body 12. In some aspects, seat 90 may be secured at interface 92 by the force applied by retainer 52. Thus, valve seat 90 may be secured so as to abut body 12 in a manner that allows removal of valve seat 90 without the need to use cutting tools to separate seat 90 from body 12.

A distal or bottom end of valve seat 90 may include an annular surface 104. Annular surface 104 and body 12 may form an interface 94 at which annular surface 104 of seat 90 contacts a supporting surface formed within a recess of body 12. Like interface 92, interface 94 may be free of welding or other mechanisms for permanently fixing seat 90 to body 12. Thus, an entirety of seat 90 may be free of welds. If desired, a sealing member 88 may be placed below circumferential surface 102 and between seat 90 and body 12.

An exemplary process for assembling valve system 10 may include assembling valve seat 90 within body 12 in a manner that facilitates subsequent removal. Valve seat 90 may be positioned within body 12 by inserting valve seat 90 through opening 13 (FIG. 2). Valve seat 90 may be placed within a recess of body 12, such that valve seat 90 contacts body 12 as shown at interfaces 92 and 94 (FIG. 4). If desired, an O-ring 88 may be sandwiched between body 12 and valve seat 90 to prevent the occurrence of leaks. With valve seat 90 positioned within body 12, piston assembly 50 may be inserted into body 12. For example, retainer 52, piston 58, and resilient member 56 of piston assembly 50 may be inserted through opening 13. Bonnet 14 may be brought into tension via one or more fasteners 80 and fixing members 82, such that a portion of retainer 52, such as protrusion 78, tightly secures valve seat 90 to body 12.

During operation of valve system 10, and with reference to FIG. 2, a flow of fluid from upstream end 110 toward downstream end 120 may apply an upward force to end face 59 of piston 58. This force may urge piston 58 against the force of resilient member 56, such that piston 58 moves upwards in a manner that compresses resilient member 56. In some aspects, the pressure of fluid may be sufficient to cause piston 58 to move a full length of the cage or retainer 52. This may bring, for example, rim 46 into contact with face 48. When the force of fluid entering via upstream end 110 drops below the amount of force exerted by resilient member 56, including when flow stops or reverses, piston 58 descends onto seat 90, blocking the reverse flow of fluid. Over time, repeated openings and closings of piston assembly 50 may cause seat 90 to accumulate wear (e.g., on a sealing surface 95).

A method or process for removing and/or replacing valve seat 90 from check valve system 10 may be performed while valve system 10 remains connected to upstream and downstream components of a pipeline, such as one or more components secured to ports 130. Once a supply of fluid to upstream end 110 has been discontinued, fasteners 80 and fixing members 82 may be removed, after which bonnet 14 may be separated from body 12 so as to release the force retaining valve seat 90. With fasteners 80 and fixing members 82 removed, components of piston assembly 50 may be separated from body 12 and withdrawn through opening 13, including resilient member 56, piston 58, and retainer 52. Valve seat 90 may then be removed through opening 13 without the need to separate a bond, such as a weld, between body 12 and seat 90. A replacement valve seat 90 may then be inserted through the upper opening of body 12, and the remaining components of piston assembly 50 may be assembled within body 12, as described above. In an alternative configuration, valve seat 90 may be removable, together with retainer 52, through opening 13. Regardless of whether valve seat 90 is removed separately or together with retainer 52, the process for removing and/or replacing valve seat 90 may be performed inline (e.g., without removing valve system 10 from a series of connected pipeline components).

It will be apparent to those skilled in the art that modifications may be made in the disclosed systems and methods without departing from the scope of the disclosure. Other aspects of the disclosure will be apparent to those skilled in the art from consideration of the specification and practice of the features disclosed herein. It is intended that the specification and embodiments be considered as exemplary only.

What is claimed is:

1. A piston check valve system, comprising:
a body;
an upstream flange;
a downstream flange, the downstream flange being disposed opposite the upstream flange;
a piston secured within the body between the upstream flange and the downstream flange, the piston including a distal end having an end face, a proximal end, and a central pillar forming a narrowed portion connected to and extending axially between the proximal end and the distal end, and being moveable between a closed position in which the end face blocks a flow of fluid and an open position;
a removable valve seat disposed within the body; and
a cage surrounding the proximal end of the piston, the cage including a distal bridge configured to surround an outer periphery of the end face of the piston, the cage being configured to secure the valve seat within the body and to guide and retain the piston within the body.

2. The piston check valve system of claim 1, further comprising:
a protrusion extending from one of the valve seat or the cage; and
a recess formed in the other of the valve seat or the cage, wherein the protrusion faces and is received by the recess.

3. The piston check valve system of claim 1, wherein the valve seat is removably secured within the body by the cage.

4. The piston check valve system of claim 1, wherein a distal end of the cage presses on a proximal end of the valve seat.

5. The piston check valve system of claim 1, wherein the valve seat is separable from the body and from the cage.

6. The piston check valve system of claim 1, wherein
the cage surrounds the proximal end, the central pillar, and the distal end of the piston.

7. The piston check valve system of claim 1, wherein the valve seat includes a sealing surface that is inclined or chamfered.

8. The piston check valve system of claim 7, wherein the sealing surface is formed at an inner periphery of the valve seat.

9. The piston check valve system of claim 1, wherein the cage and the valve seat each surround part of the distal end of the piston in the closed position.

10. The piston check valve system of claim 9, wherein the valve seat extends distally of the cage.

11. A piston check valve system, comprising:
a body;
an upstream flange;
a downstream flange, the downstream flange being disposed opposite the upstream flange;
a piston secured within the body between the upstream flange and the downstream flange, the piston being moveable between a closed position in which an end face blocks a flow of fluid and an open position;
a cage surrounding a proximal end of the piston, the cage including a distal bridge configured to surround an outer periphery of the end face of the piston, the cage being configured to guide and retain the piston within the body; and
a bonnet secured to a proximal opening of the body, wherein the piston includes a rim configured to contact the bonnet when the piston is in the open position.

12. The piston check valve system of claim 11, wherein the cage surrounds the proximal end, a central pillar, and the distal end of the piston.

13. The piston check valve system of claim 11, further comprising:
a removable valve seat disposed within the body, wherein the cage is configured to secure the valve seat within the body.

14. A piston check valve, comprising:
a body;
an upstream opening;
a downstream opening;
a piston having a proximal end portion and a distal end portion, the piston being secured within the body between the upstream opening and the downstream opening and being movable from a closed position to an open position in response to fluid pressure from the upstream opening;
a retainer contacting the proximal end portion of the piston and the distal end portion of the piston; and a removable valve seat having an opening sized to receive the distal end portion of the piston when the piston is in the closed position, the opening of the removable valve seat formed by an inclined surface configured to form a seal with the distal end portion of the piston.

15. The piston check valve of claim 14, wherein the proximal end portion of the piston includes a piston ring that contacts the retainer.

16. The piston check valve of claim 14, wherein the upstream opening overlaps the downstream opening in a lateral direction that is orthogonal to a proximal-distal direction.

17. The piston check valve of claim 16, wherein the upstream opening and the distal opening overlap the removable valve seat in the lateral direction.

18. The piston check valve of claim 17, further including a protrusion extending from one of the valve seat or the retainer in the proximal-distal direction.

\* \* \* \* \*